United States Patent
Shveidel et al.

(10) Patent No.: US 12,436,715 B2
(45) Date of Patent: Oct. 7, 2025

(54) CREATING AND USING MULTIPLE FLUSH WORKING SETS IN A DATA STORAGE SYSTEM

(71) Applicant: Dell Products L.P., Round Rock, TX (US)

(72) Inventors: Vladimir Shveidel, Pardes-Hana (IL); Geng Han, Beijing (CN); Jibing Dong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/133,117

(22) Filed: Apr. 11, 2023

(65) Prior Publication Data
US 2024/0345767 A1 Oct. 17, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0656* (2013.01); *G06F 3/0688* (2013.01)
(58) Field of Classification Search
None
See application file for complete search history.

(56) References Cited

U.S. PATENT DOCUMENTS

| | | |
|---|---|---|
| 9,069,673 B2 | 6/2015 | Kim et al. |
| 9,229,809 B2 | 1/2016 | Moss et al. |
| 10,540,355 B1 * | 1/2020 | Agnich ................. G06F 16/25 |
| 10,684,787 B1 * | 6/2020 | Li ......................... G06F 16/322 |
| 10,936,499 B2 | 3/2021 | Jia et al. |
| 10,997,073 B2 | 5/2021 | Lee et al. |
| 2012/0131240 A1 * | 5/2012 | Aronovich ............ G06F 3/0683 710/53 |
| 2018/0232165 A1 * | 8/2018 | Kusters ................. G06F 3/065 |
| 2018/0276142 A1 * | 9/2018 | Algieri ................. G06F 3/0619 |
| 2020/0364152 A1 * | 11/2020 | Park ..................... G06F 12/1027 |
| 2021/0056023 A1 * | 2/2021 | Jin ........................ G06F 3/0679 |
| 2021/0365376 A1 * | 11/2021 | Roberts ............... G06F 12/0815 |

OTHER PUBLICATIONS

Yang, Zhenkun, et al. "OceanBase: 1 707 Million tpmC Distributed Relational Database System", proceedings of the VLDB Endowment, vol. 15, No. 12 ISSN 2150-8097, 13 pages.
Shuaijie Li, "OceanBase: A 707 Million tpmC Distributed Relationial Database System", 15 pages.

* cited by examiner

*Primary Examiner* — Jared I Rutz
*Assistant Examiner* — Alexander J Yoon
(74) *Attorney, Agent, or Firm* — BainwoodHuang

(57) ABSTRACT

Multiple co-resident flush working sets are created in a data storage system. Each flush working set indicates host data that was received by the data storage system from at least one host computing device during a period of time corresponding to that flush working set. Host data indicated by the flush working sets is to be flushed from a storage processor of the data storage system to non-volatile data storage devices of the data storage system, and indications of host data within the flush working sets are organized according to logical block addresses of the indicated host data. Multiple independently executing flusher threads flush the host data indicated by at least one of the flush working sets from the storage processor to the non-volatile data storage devices of the data storage system.

18 Claims, 7 Drawing Sheets

CREATING AND USING MULTIPLE FLUSH WORKING SETS IN A DATA STORAGE SYSTEM

TECHNICAL FIELD

The present disclosure relates generally to data storage systems, and more specifically to technology for flushing received host data from a storage processor of a data storage system to non-volatile data storage devices.

BACKGROUND

Data storage systems are arrangements of hardware and software that are coupled to non-volatile data storage drives, such as solid state drives and/or magnetic disk drives. The data storage system processes host I/O requests received from physical and/or virtual host machines ("hosts"). The host I/O requests received by the data storage system specify host data that is written and/or read by the hosts. The data storage system executes software that processes the host I/O requests, and performs various data processing tasks that efficiently organize and persistently store the host data in the non-volatile data storage drives of the data storage system.

Data storage systems may temporarily store received host data within a log data structure maintained in persistent memory, prior to subsequently flushing the host data from the log to its final location on a non-volatile data storage device. After the received host data has been stored in the log, the data storage system can immediately acknowledge completion of the I/O write request that wrote the host data. Using a persistent log in this way enables the data storage system to quickly return an acknowledgement to a host that issued the I/O write request, and then later asynchronously flush the host data to its final location. Persistent logs of this kind may sometimes be referred to as journals, and flushing the host data to the non-volatile data storage device may sometimes be referred to as de-staging.

SUMMARY

In the disclosed technology, multiple co-resident flush working sets are created in a data storage system. Each one of the flush working sets indicates host data that was received by the data storage system from at least one host computing device during a period of time corresponding to that flush working set. Host data indicated by the flush working sets is to be flushed from a storage processor of the data storage system to non-volatile data storage devices of the data storage system, and indications of host data within the flush working sets are organized according to logical block addresses of the indicated host data. Multiple independently executing flusher threads flush the host data indicated by at least one of the flush working sets from the storage processor to the non-volatile data storage devices of the data storage system.

In some embodiments, the flush working sets are created by creating a currently active flush working set and multiple frozen flush working sets. New indications of host data received by the data storage system are added only to the currently active flush working set, and the flusher threads flush host data indicated by at least one of the frozen flush working sets from the storage processor to the non-volatile data storage devices.

In some embodiments, the flusher threads flush host data indicated by an oldest one of the frozen flush working sets from the storage processor to the non-volatile data storage devices before flushing host data indicated by any other one of the frozen flush working sets.

In some embodiments, a flush working set creation event may be detected. In response to detecting the flush working set creation event, the currently active flush working set is frozen such that no more indications of received host data are added to it, and a new currently active flush working set is created. Indications of subsequently received host data are then added to the new currently active flush working set.

In some embodiments, further in response to detecting the flush working set creation event, and in response to also detecting that all host data indicated by the oldest one of the frozen flush working sets has not yet been completely flushed from the storage processor to the non-volatile data storage devices, the freezing of the currently active flush working set and the creation of the new currently active flush working set are delayed until after all host data indicated by the oldest one of the frozen flush working sets has been completely flushed from the storage processor to the non-volatile data storage devices.

In some embodiments, detecting the flush working set creation event is performed by detecting that the currently active flush working set has consumed a threshold amount of a shared resource in the storage processor.

In some embodiments, the shared resource in the storage processor is a log containing page descriptors indicating page buffers in the storage processor storing blocks of received host data to be flushed to the non-volatile data storage devices, and the threshold amount is a specific predetermined percentage of a total number of page descriptors contained in the log.

In some embodiments, each flush working set includes multiple leaf nodes, and each leaf node stores indications of blocks of host data having logical block addresses within a range of logical block addresses corresponding to that leaf node. Indications of blocks of host data are ordered within each leaf node according to the logical block addresses of the blocks of host data indicated by that leaf node.

In some embodiments, the ranges of logical block addresses corresponding to the leaf nodes node in the currently active flush working set all have a first size, and the new currently active flush working set is created such that the ranges of logical block addresses corresponding to the leaf nodes in the new currently active flush working set have a second size that is different from the first size.

The disclosed technology is integral to a practical technical solution for flushing host data from a storage processor of a data storage system to non-volatile data storage devices of the data storage system. In the disclosed technology, by storing indications of host data received within specific periods of time within corresponding flush working sets, a data storage system advantageously ensures that older host data is flushed before more recently received host data. The disclosed technology thus prevents host data from remaining unflushed indefinitely. Accordingly, resources (e.g. log entries) used to store older host data can be reclaimed and reused to store more recently received host data, thus preventing those resources allocated to storing the older host data from interfering with the allocation of resources to store the more recently received host data. In addition, a storage processor may advantageously determine when all host data received prior to a specific time has been flushed, by determining that the host data indicated by a flush working set corresponding to a time period including that specific time has been completely flushed. The disclosed technology may further provide effective adaptation to different host data write patterns that may occur, by adjusting parameters of a newly created flush working set based on previous host data write patterns, e.g. by changing the size of logical address ranges corresponding to leaf nodes of a newly created flush working set. In addition, flushing from a frozen flush working set instead of from an active flush working set that is receiving indications of newly received host data may advantageously reduce contention for shared resources. Sorted indications of host data in the leaves of each flush working set, indicating host data having logical block addresses within corresponding ranges of logical block addresses, also enable flushing to be performed in aggregated sets of host data blocks that can be stored together in the non-volatile data storage devices, so that the host data can be efficiently retrieved in the likely event that the aggregated host data blocks are subsequently retrieved together from the non-volatile data storage devices.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
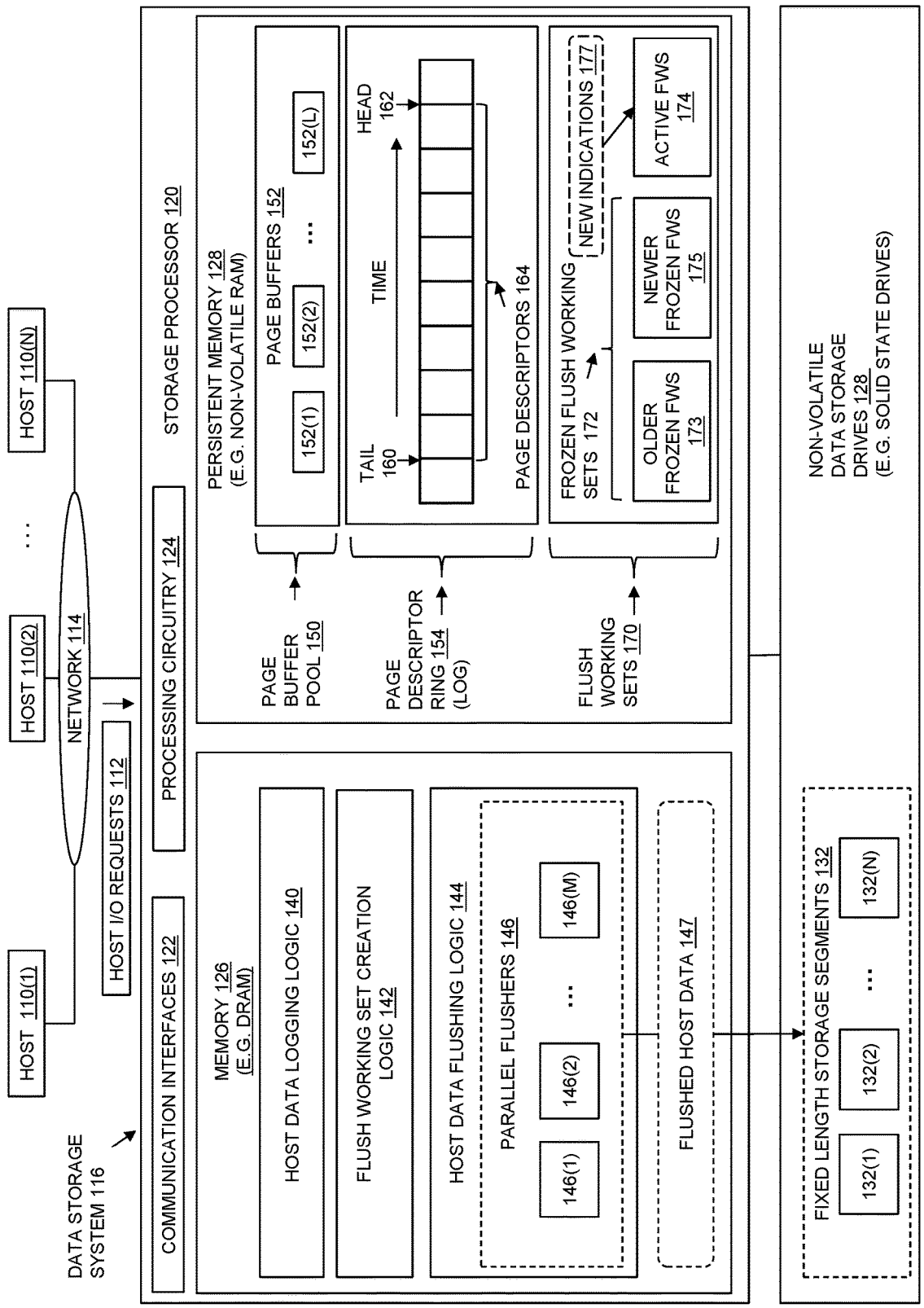
FIG. 1 is a block diagram showing an example of a data storage system including an illustrative embodiment of the disclosed technology.

Embodiments will now be described with reference to the figures. The embodiments described herein are provided only as examples, in order to illustrate various features and principles of the disclosed technology, and are not limiting. The embodiments of disclosed technology described herein are integrated into a practical solution for flushing host data from a storage processor of a data storage system to non-volatile data storage devices of the data storage system.

In the disclosed technology, multiple co-resident flush working sets are created in a persistent memory of storage processor in a data storage system. Each one of the flush working sets indicates only host data that was received by the data storage system from at least one host computing device during a period of time corresponding to that flush working set. The host data indicated by the flush working sets is to be subsequently flushed from the persistent memory to non-volatile data storage devices of the data storage system. The indications of host data within the flush working sets are organized according to logical block addresses of the indicated host data, to assist multiple independently executing flusher threads in flushing host data indicated by at least one of the flush working sets from the storage processor to the non-volatile data storage devices of the data storage system.

The flush working sets may be created by creating a currently active flush working set and multiple frozen flush working sets. New indications of host data received by the data storage system are added only to the currently active flush working set, and the flusher threads flush host data indicated by at least one of the frozen flush working sets from the storage processor to the non-volatile data storage devices. For example, the flusher threads flush host data indicated by an oldest one of the frozen flush working sets from the storage processor to the non-volatile data storage devices before flushing host data indicated by any other one of the frozen flush working sets.

In response to detecting a flush working set creation event, the currently active flush working set is frozen such that no more indications of received host data are added to it, and a new currently active flush working set is created. Indications of subsequently received host data are then added to the new currently active flush working set. Further in response to detecting the flush working set creation event, and in response to also detecting that all host data indicated by the oldest one of the frozen flush working sets has not yet been completely flushed from the storage processor to the non-volatile data storage devices, the freezing of the currently active flush working set and the creation of the new currently active flush working set may be delayed until after all host data indicated by the oldest one of the frozen flush working sets has been completely flushed from the storage processor to the non-volatile data storage devices.

Detecting the flush working set creation event may include or consist of detecting that the currently active flush working set has consumed a threshold amount of a shared resource in the storage processor. The shared resource in the storage processor is a log containing page descriptors indicating page buffers in the storage processor storing blocks of received host data to be flushed to the non-volatile data storage devices, and the threshold amount is a predetermined specific percentage of a total number of page descriptors contained in the log.

Each flush working set may include multiple leaf nodes, and each leaf node stores indications of blocks of host data having logical block addresses within a range of logical block addresses corresponding to that leaf node. Indications of blocks of host data are ordered within each leaf node according to the logical block addresses of the blocks of host data indicated by that leaf node. The ranges of logical block addresses corresponding to the leaf nodes node in the currently active flush working set may all have a first size, and the new currently active flush working set may be created such that the ranges of logical block addresses corresponding to the leaf nodes in the new currently active flush working set have a second size that is different from the first size.

FIG. 1 is a block diagram showing an operational environment for the disclosed technology, including an example of a Data Storage System 116 in which the disclosed technology is embodied. FIG. 1 shows a number of physical and/or virtual Host Computing Devices 110, referred to herein for purposes of explanation as "hosts" (sometimes alternatively referred to as "clients"), and shown for purposes of illustration by Hosts 110(1) through 110(N). The hosts and/or applications executing thereon issue Host I/O Requests 112 (e.g. host I/O read requests and host I/O write requests) that access non-volatile data storage provided by Data Storage System 116. For example, Host I/O Requests 112 are issued by the hosts to Data Storage System 116 over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications consuming non-volatile data storage provided by Data Storage System 116 may execute within Data Storage System 116.

Data Storage System 116 includes at least one storage processor, shown by Storage Processor 120. Storage Processor 120 is communicably coupled to both Network 114 and physical Non-Volatile Data Storage Drives 128, e.g. at least in part though one or more Communication Interfaces 122. No particular hardware configuration is required, and Storage Processor 120 may be embodied as any specific type of device that is capable of i) processing host input/output (I/O) requests (e.g. I/O read and I/O write requests, etc.), and ii) persistently storing host data.

The Non-Volatile Data Storage Drives 128 may include physical data storage drives such as solid state drives, magnetic disk drives, hybrid drives, optical drives, and/or other specific types of drives. In some embodiments, Physical Non-Volatile Data Storage Drives 128 may consist of or include a disk array enclosure or the like.

A Memory 126 in Storage Processor 120 stores program code that is executed on Processing Circuitry 124, as well as data generated and/or processed by such program code. Memory 126 may consist of volatile memory, e.g. DRAM (Dynamic Random-Access Memory).

Memory 126 is communicably coupled to a persistent memory (PMEM), shown by Persistent Memory 128. Persistent Memory 128 is used by program code executing in Memory 126, in order to temporarily store host data, using data structures, etc., that may be generated and/or accessed by Host Data Logging Logic 140, Flush Working Set Creation Logic 142, Host Data Flushing Logic 144, and/or other program code executing in the Storage Processor 120. The contents of Persistent Memory 128 are not lost when power is turned off to the Storage Processor 120, as may occur suddenly and unexpectedly when Storage Processor 120 experiences a failure event. For example, Persistent Memory 128 may consist of or include battery-backed RAM (Random Access Memory).

In some embodiments, the contents Persistent Memory 128 may be mirrored by Storage Processor 120 to another persistent memory that is located in another storage processor of the Data Storage System 116.

Processing Circuitry 124 may include or consist of one or more processor cores ("processors"), e.g. within one or more multi-core processor packages. Each processor core may include or consist of a processing unit, made up of electronic circuitry that is capable of executing instructions.

Processing Circuitry 124, Memory 126, and Persistent Memory 128 together form electronic control circuitry that is configured and arranged to carry out various methods and functions described herein. The Memory 126 stores a variety of software components that may be provided in the form of executable program code. For example, Memory 126 may include software components including Host Data Logging Logic 140, Flush Working Set Creation Logic 142, and Host Data Flushing Logic 144. When instructions of the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also or alternatively include various other specific types and arrangements of software components.

During operation of the components shown in FIG. 1, Storage Processor 120 receives host data from Hosts 110. The host data received by Storage Processor 120 is indicated by I/O write requests within Host I/O Requests 112. Host Data Logging Logic 140 temporarily stores blocks of received host data (sometimes referred to as "pages" of host data) within page buffers in Persistent Memory 128. The blocks of host data stored in the page buffers in Persistent Memory 128 are host data that is to be later flushed (or "de-staged") from the Storage Processor 120 to what may be referred to as the host data's "final" location within Non-Volatile Data Storage Drives 128.

For example, Host Data Logging Logic 140 temporarily stores individual blocks of received host data into individual page buffers that are allocated from a pool of page buffers shown by Page Buffer Pool 150. Page Buffer Pool 150 includes Page Buffers 152, shown by page buffers 152(1), 152(2), and so on through 152(L). Each block of host data consists of a predetermined number of bytes of host data. For example, each block of received host data stored into one of the page buffers may be four kilobytes in size (4 KB). Each block of host data has a corresponding logical block address (LBA) within a logical address space that is used by the hosts and/or the data storage system to refer to and/or access individual blocks of host data that are stored by the data storage system.

Host Data Logging Logic 140 stores pointers to the page buffers that store received host data into a log data structure that is also maintained in Persistent Memory 128. The log data structure is shown by Page Descriptor Ring 154. Page Descriptor Ring 154 is made up of Page Descriptors 154. Each page descriptor in Page Descriptors 154 includes a pointer to one of the page buffers in Page Buffers 152 that currently contains host data that needs to be flushed from Storage Processor 120 to Non-Volatile Data Storage Drives 128. For example, Page Descriptor Ring 154 may be a circular ring data structure. Page descriptors that contain pointers to page buffers storing newly received host data are added at Head 162, as the host data is received. Page descriptors are reclaimed for reuse at Tail 160 after the host data in the page buffers that they point to has been flushed to Non-Volatile Data Storage Drives 128. The page descriptors in Page Descriptor Ring 154 are temporally ordered within Page Descriptor Ring 154, based on the times at which individual blocks of host data are received, such that page descriptors located more towards the Head 162 point to page buffers storing more recently received host data, while page descriptors located more towards the Tail 160 point to page buffers storing less recently received host data.

After a block of received host data has been stored in one of Page Buffers 152 and a page descriptor pointing to that page buffer has been added to Page Descriptor Ring 154, that block of host data is persistently stored. Accordingly, after all blocks of host data for a given I/O write request have been stored in page buffers within Page Buffers 152, and page descriptors for those page buffers have been added to Page Descriptor Ring 154, that host data has been secured by Data Storage System 116, and Data Storage System 116 acknowledges successful completion of the I/O write request to the host that issued the I/O write request.

Further during operation of the components shown in FIG. 1, Flush Working Set Creation Logic 142 creates multiple co-resident flush working sets in Persistent Memory 128, e.g. Flush Working Sets 170. As shown in FIG. 1, the multiple flush working sets in Flush Working Sets 170 are simultaneously present in Persistent Memory 128, and they are therefore co-resident in Persistent Memory 128. In the example of FIG. 1, Flush Working Sets 170 include two frozen flush working sets, e.g. Frozen Flush Working Sets 172, and Active Flush Working Set 174. Each flush working set in Flush Working Sets 170 indicates only host data that was received by Data Storage System 116 from at least one of the Hosts 116 during a period of time (e.g. some number of seconds) corresponding to that flush working set. For example, Older Frozen Flush Working Set 173 indicates only host data that was received during a least recent period of time, Newer Frozen Flush Working Set 175 indicates only host data that was received during a period of time beginning after the end of the period of time corresponding to Older Frozen Flush Working Set 173, and Active Flush Working Set 174 indicates only host data that was received during a period of time beginning after the end of the period of time corresponding to Newer Frozen Flush Working Set 175.

The host data indicated by Flush Working Sets 170 is host data stored in Page Buffers 152 that needs to be flushed from Storage Processor 120 to Non-Volatile Data Storage Devices 128. For example, the indications of host data stored in Flush Working Sets 170 may be pointers to page descriptors located in Page Descriptor Ring 154 that point to page buffers that currently store host data that needs to be flushed. For example, each leaf node in each one of the flush working sets may contain pointers to page descriptors located in Page Descriptor Ring 154 that point to page buffers currently storing host data to be flushed.

The indications of host data to be flushed that are stored within the flush working sets in Flush Working Sets 170 are organized according to logical block addresses (LBAs) of the indicated host data. For example, each leaf node of the flush working sets may be assigned a corresponding address range of LBAs within the logical address space for the host data. Each given leaf node only stores indications of blocks of host data having corresponding LBAs that fall within the address range corresponding to that leaf. For example, each individual leaf node may store only pointers to page descriptors that store pointers to page buffers currently storing blocks of host data having corresponding LBAs that fall within the address range corresponding to that leaf node.

In addition, the pointers to page descriptors contained within each individual leaf node of the flush working sets are sorted in (e.g. ascending) order of the LBAs of the blocks of host data currently stored in the page buffers indicated by the page descriptors indicated by the pointers contained within that leaf node.

Further during operation of the components shown in FIG. 1, multiple independently executing flusher threads in Host Data Flushing Logic 144 flush the host data indicated by at least one of the flush working sets in Flush Working Sets 170 from Storage Processor 120 to the Non-Volatile Data Storage Devices 128. For example, Host Data Flushing Logic 144 includes Parallel Flushers 146, consisting of flusher threads 146(1), 146(2), and so on through flusher thread 146(M). Each one of the flusher threads executes independently from the other flusher threads, and operates in the same way as all other flusher threads. For example, each flusher thread operates by detaching individual leaf nodes from at least one of the flush working sets in Flush Working Sets 170, e.g. from Older Frozen Flush Working Set 173. After detaching a leaf node, the flusher thread then locates the host data indicated by the leaf node, e.g. by first finding the page descriptors indicated by the pointers stored in the leaf node, and then using the page descriptors to find the page buffers indicated by the page descriptors. The flusher thread then flushes the blocks of host data indicated by the leaf node in aggregate to Non-Volatile Data Storage Drives 128, e.g. as Flushed Host Data 147. Because the pointers in each leaf node are ordered by the LBAs of the host data they indicate, and because the pointers in each leaf node indicate only host data within a corresponding range of LBAs, the flusher thread conveniently flushes multiple, aggregated blocks of host data together, in a single flush operation, such that the aggregated blocks of host data i) have LBAs within the range of LBAs corresponding to the detached leaf node, and ii) are ordered based on their corresponding LBAs.

Each one of the Parallel Flushers 146 also corresponds to a respective one of the Fixed Length Storage Segments 132, e.g. to one of the fixed length storage segments 132(1), fixed storage segment 132(2), and so on through fixed storage segment 132(N). Each fixed length storage segment may be a physically contiguous segment of non-volatile data storage, and has a fixed size. The fixed size of each fixed length storage segment may be the same as for all other fixed length storage segments, and is configuration or implementation specific. For example, the fixed size of the fixed length storage segments may be two megabytes (2 MB) each. Each flusher thread in Parallel Flushers 146 flushes host data from Storage Processor 120 only into the respective one of the Fixed Length Storage Segments 132 corresponding to that flusher thread.

In some embodiments each flusher thread in Parallel Flushers 146 may also perform processing such as deduplication and/or compression on the Flushed Host Data 147 prior to flushing it to the respective one of Fixed Length Storage Segments 132 corresponding to that flusher thread.

In some embodiments, Flush Working Set Creation Logic 142 creates Flush Working Sets 170 by creating a currently active flush working set, shown in FIG. 1 by Active Flush Working Set 174, and multiple frozen flush working sets, shown in FIG. 1 by Frozen Flush Working Sets 172. New indications of blocks of host data newly received by Data Storage System 116 are added only to Active Flush Working Set 174, as shown by New Indications 177. The Parallel Flushers 146 may only flush host data indicated by one or more of Frozen Flush Working Sets 172 from Storage Processor 120 to Non-Volatile Data Storage Devices 128. In some embodiments, the Parallel Flushers 146 may only flush blocks of host data that are indicated by an oldest one of the Frozen Flush Working Sets 172 from Storage Processor 120 to Non-Volatile Data Storage Devices 128, e.g. from Older Frozen Flush Working Set 173, before flushing blocks of host data indicated by any other ones of the Frozen Flush Working Sets 172, and/or blocks of host data indicated by Active Flush Working Set 174.

In some embodiments, Flush Working Set Creation Logic 142 may detect a flush working set creation event. In response to detecting the flush working set creation event, Flush Working Set Creation Logic 142 may freeze the currently active flush working set, e.g. Active Flush Working Set 174, such that no more indications of received host data are added to it, and Active Flush Working Set 174 becomes one of the Frozen Flush Working Sets 172. Further in response to detecting the flush working set creation event, Flush Working Set Creation Logic 142 may create a new currently active flush working set. Flush Working Set Creation Logic 142 then adds indications of blocks of all subsequently received host data to the new currently active flush working set, until the new currently active flush working set is frozen at some later point in time.

In some embodiments, further in response to detecting the flush working set creation event, and in response to also detecting that all blocks of host data indicated by the oldest one of the frozen flush working sets have not yet been completely flushed from the Storage Processor 120 to the Non-Volatile Data Storage Devices 128, Flush Working Set Creation Logic 142 may delay the freezing of the currently active flush working set and the creation of the new currently active flush working set until after all blocks of host data indicated by the oldest one of the frozen flush working sets (e.g. Older Frozen Flush Working Set 173) have been completely flushed from the Storage Processor 120 to the Non-Volatile Data Storage Devices 128.

In some embodiments, the Flush Working Set Creation Logic 142 detects the flush working set creation event by detecting that the currently active flush working set, e.g. Active Flush Working Set 174, has consumed a threshold amount of a shared resource in Storage Processor 120. For example, the shared resource may be a log, such as Page Descriptor Ring 154. In such a case, each one of the flush working sets consumes page descriptors of Page Descriptor Ring 154 when pointers to page descriptors are stored into their leaf nodes. In such embodiments, the threshold amount may be a predetermined specific percentage of the total number of page descriptors contained in Page Descriptor Ring 154. For example, in the case of a configuration in which there are a total of three co-resident flush working sets (e.g. one active flush working set and two frozen flush working sets), the predetermined percentage may be thirty percent (30%) of the total number of page descriptors in Page Descriptor Ring 154, thus allowing each one of the flush working sets to consume (i.e. store pointers to) thirty percent of the page descriptors in Page Descriptor Ring 154, while also leaving ten percent (10%) of the page descriptors in Page Descriptor Ring 154 left over as spares for handling edge conditions or the like.

As mentioned above, each flush working set includes multiple leaf nodes, each leaf node stores indications of blocks of host data having corresponding LBAs that are within a range of LBAs corresponding to that leaf node, and the indications of blocks of host data are ordered within each leaf node according to the LBAs of the blocks of host data indicated by that leaf node. In some embodiments, the LBA ranges corresponding to the leaf nodes node in the currently active flush working set that is being frozen (e.g. Active Flush Working Set 174) all have the same size, e.g. two megabytes (2 MB). Flush Working Set Creation Logic 142 may create a new currently active flush working set such that the LBA ranges corresponding to the leaf nodes in the new currently active flush working set all have a new size that is different from the old LBA range size for the leaf nodes in the flush working set that is being frozen, i.e. a new size that is different from an old size that is the size of the LBA ranges corresponding to the leaf nodes in Active Flush Working Set 174. The new LBA range size may be larger or smaller than old LBA range size, and may be determined based on a previous pattern of host data writes.

For example, each leaf node may be configured with a fixed number of entries for storing pointers to page descriptors, e.g. 512 entries. It may also be optimal for leaf node to store, on average, some predetermined number of pointers to page descriptors, e.g. an average of 128 pointers to page descriptors per leaf node. Flush Working Set Creation Logic 144 may detect that the leaf nodes in the active flush working set being frozen typically stored significantly less than the optimal number of pointers to page descriptors, e.g. averaged only one pointer per leaf node, as may occur during a random pattern of host data writes. In such a case, Flush Working Set Creation Logic 144 may set the new LBA range size for the new currently active flush working set to be larger than the old size, e.g. an LBA range with a size that is larger than 2 MB, to attempt to prospectively increase the average number of pointers stored per leaf node.

Alternatively, Flush Working Set Creation Logic 144 may detect that the leaf nodes in the active flush working set being frozen typically stored significantly more than the optimal number of pointers to page descriptors, e.g. an average of 512 pointers per leaf node, as may occur during a logically sequential pattern of host data writes. In such a case, Flush Working Set Creation Logic 144 may set the new LBA range size for the new currently active flush working set to be smaller than the old size, e.g. an LBA range with a size that is smaller than 2 MB, to attempt to prospectively decrease the average number of pointers stored per leaf node.

Figure 2:
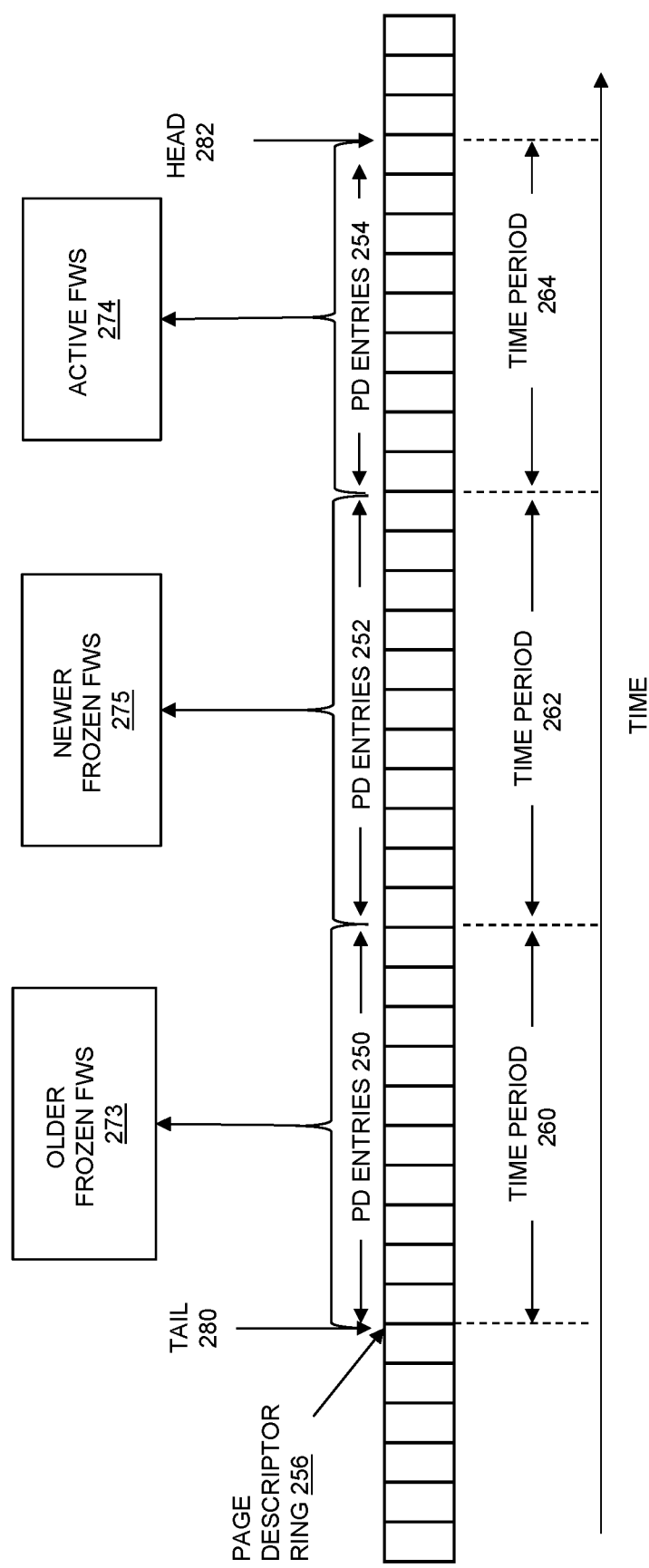
FIG. 2 is a block diagram illustrating relationships between multiple co-resident flush working sets and corresponding time periods, and between the flush working sets and ranges of page descriptors contained in a log.

FIG. 2 is a block diagram illustrating relationships between multiple co-resident flush working sets and corresponding time periods, through ranges of page descriptors contained in a temporally organized log. As shown in FIG. 2, a Page Descriptor Ring 256 includes page descriptors between a Tail 280 and a Head 282. The Page Descriptor Entries 250 each have a pointer to a page buffer currently storing a block of host data that was received during Time Period 260, the Page Descriptor Entries 252 each have a pointer to a page buffer currently storing a block of host data that was received during Time Period 262, and Page Descriptor Entries 254 each have a pointer to a page buffer currently storing a block of host data that was received during Time Period 264. Time Period 262 is subsequent to Time Period 260, and Time Period 264 is subsequent to Time Period 262. The leaf nodes in Older Frozen Flush Working Set 273 store pointers to Page Descriptor Entries 250, the leaf nodes in Newer Frozen Flush Working Set 275 store pointers to Page Descriptor Entries 252, and the leaf nodes in Active Flush Working Set 274 store pointers to Page Descriptor Entries 254. In this way, the leaf nodes in Older Frozen Flush Working Set 273 store indications of host data that was received during Time Period 260, the leaf nodes in Newer Frozen Flush Working Set 275 store indications of host data that was received during Time Period 262, and the leaf nodes in Active Flush Working Set 274 store indications of host data that was received during Time Period 264.

Figure 3:
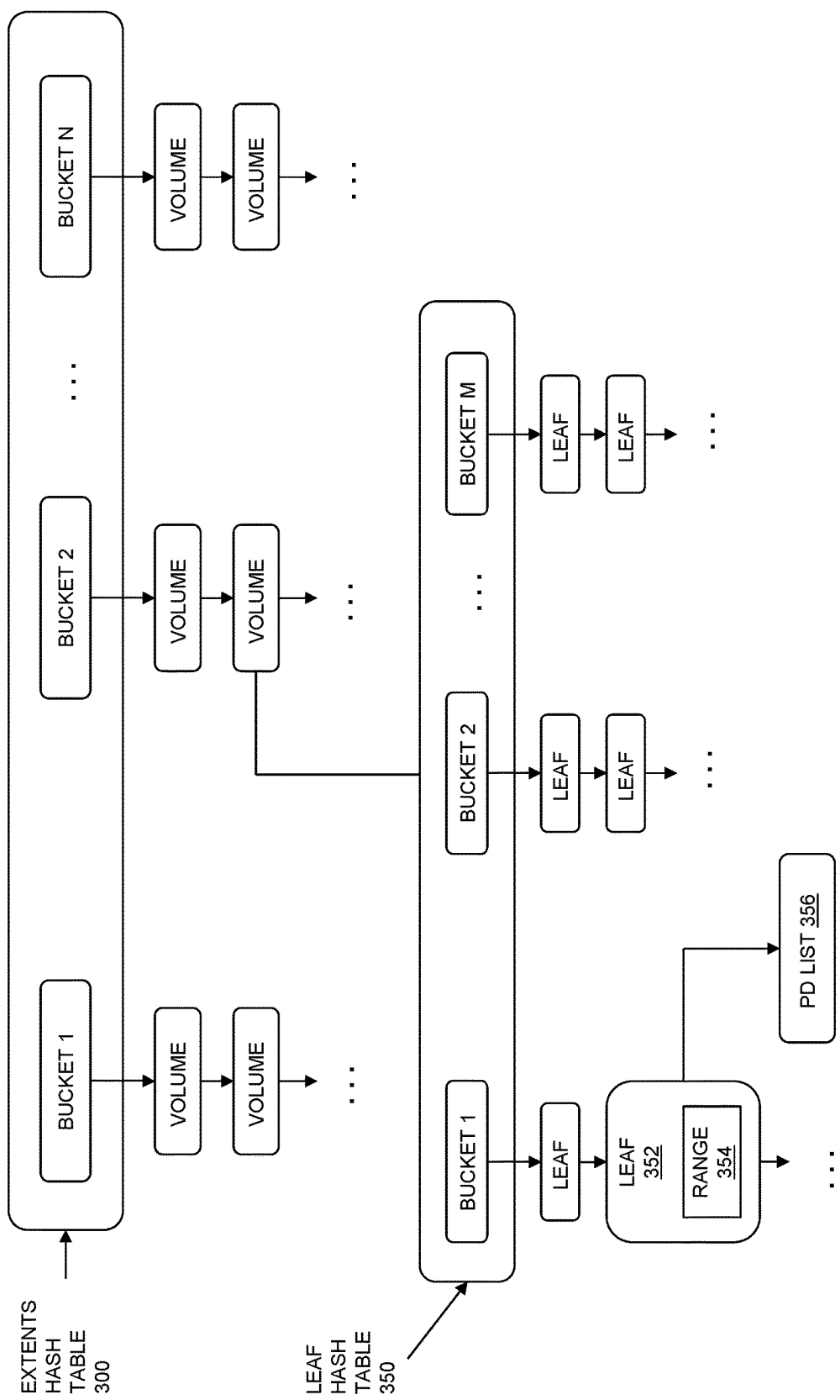
FIG. 3 is a block diagram showing an example of components in a flush working set.

FIG. 3 is a block diagram showing an example of components in a flush working set. As shown in FIG. 3, an Extents Hash Table 300 is a hash table in which the buckets are associated with storage volumes. For example, the individual buckets in Extents Hash Table 300 may be identified by applying a predetermined hash function to a volume identifier associated with a block of host data. Each bucket in Extent Hash Table 300 includes one or more per-volume leaf hash tables, as illustrated by Leaf Hash Table 350. Leaf Hash Table 350 is a hash table in which the buckets are associated with leaf nodes. For example, individual buckets in Leaf Hash Table 350 may be identified by applying another predetermined hash function to a logical block address (LBA) associated with a block of host data.

Each bucket in the Leaf Hash Table 350 includes one or more leaf nodes. Each leaf node has an assigned range of logical block addresses that corresponds to the leaf node. Each leaf node also has a list of entries, each of which points to a page descriptor. For purposes of illustration in FIG. 3, the leaf node Leaf 352 has a corresponding assigned LBA range that is shown by Range 354. Also as illustrated in FIG. 3, the leaf node Leaf 352 has a list of entries storing pointers to page descriptors, as shown by PD List 356.

Figure 4:
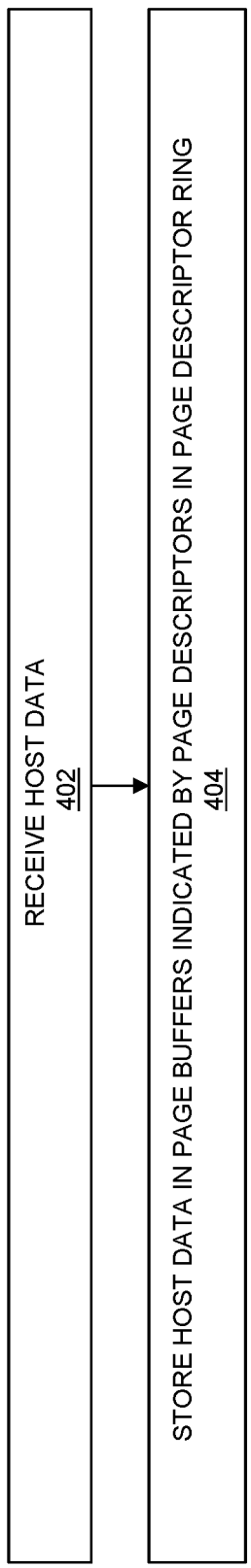
FIG. 4 is a flow chart showing an example of steps performed in some embodiments while storing received host data into a log.

FIG. 4 is a flow chart showing an example of steps performed in some embodiments while storing received host data into a log. The steps of FIG. 4 may, for example, be performed in whole or in part by the Host Data Logging Logic 140 shown in FIG. 1.

At step 402, blocks of host data are received by the Data Storage System 116, e.g. by Storage Processor 120.

At step 404, the blocks of host data received at step 402 are stored into page buffers, e.g. into the Page Buffers 152. Indications of the page buffers into which the blocks of host data are stored (e.g. pointers to those page buffers) are stored in page descriptor entries within a page descriptor ring, e.g. pointers to the page buffers are stored in page descriptors that are added to Page Descriptor Ring 154 at Head 162 as the blocks of host data are received.

Figure 5:
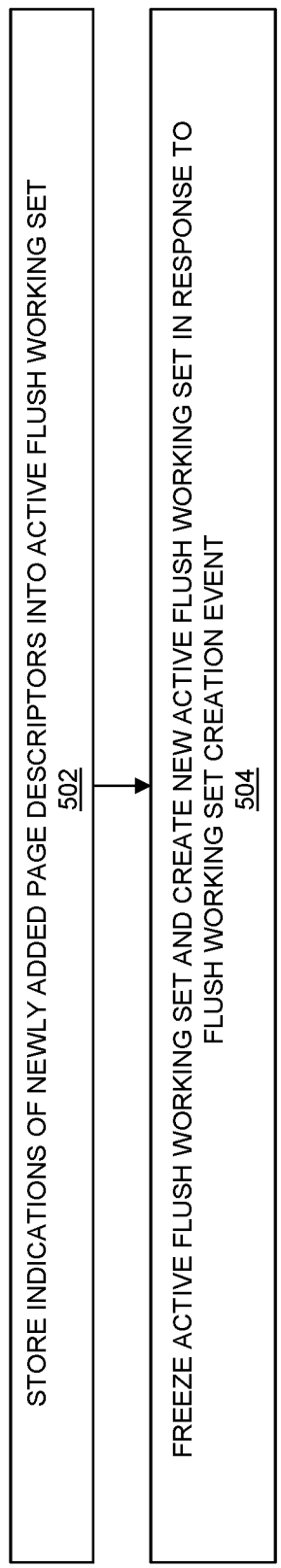
FIG. 5 is a flow chart showing an example of steps performed in some embodiments while creating multiple flush working sets.

FIG. 5 is a flow chart showing an example of steps performed in some embodiments while creating multiple flush working sets. The steps of FIG. 5 may, for example, be performed in whole or in part by the Flush Working Set Creation Logic 142 shown in FIG. 1.

At step 502, indications of page descriptors storing pointers to page buffers currently storing blocks of host data are added to the current active flush working set as the page descriptors are added to the page descriptor ring, e.g. pointers to page descriptors in Page Descriptor Ring 154 are added to leaf nodes of Active Flush Working Set 174 as those page descriptors are added to Page Descriptor Ring 154 at Head 162.

At step 504, the current flush working set is frozen, and a new active flush working set is created, in response to detecting a flush working set creation event, e.g. Active Flush Working Set 174 is frozen, and a new active flush working set is created. Indications of subsequently received blocks of host data are added to the new active flush working set.

Figure 6:
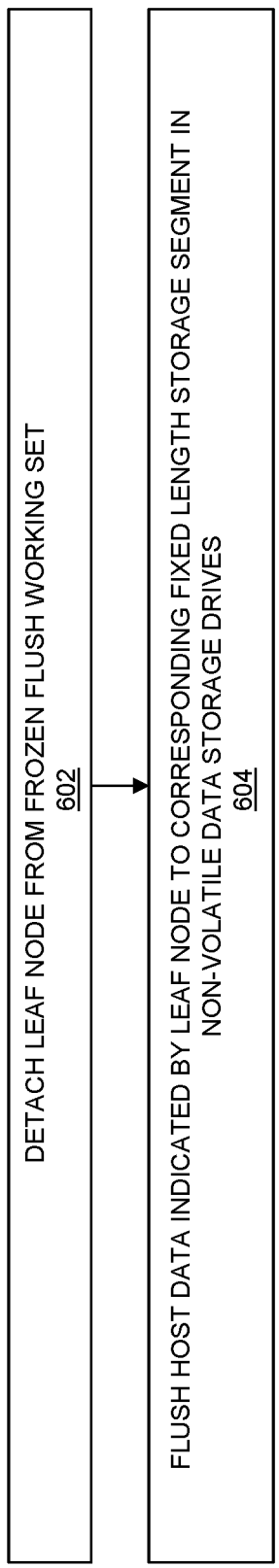
FIG. 6 is a flow chart showing an example of steps performed in some embodiments while flushing host data.

FIG. 6 is a flow chart showing an example of steps performed in some embodiments while flushing host data. The steps of FIG. 6 may, for example, be performed in whole or in part by the Host Data Flushing Logic 144 shown in FIG. 1.

At step 602, a flushing thread (e.g. one of Parallel Flushers 146) detaches a leaf node from one of the Frozen Flush Working Sets 172, e.g. one of Parallel Flushers 146 detaches a leaf node from Older Frozen Flush Working Set 173.

At step 604, the flushing thread flushes the host data indicated by the detached leaf node from the storage processor to a corresponding storage segment in non-volatile data storage, e.g. the one of Parallel Flushers 146 flushes the host data indicated by the leaf node detached from Older Frozen Flush Working Set 173 to one of Fixed Length Storage Segments 132 corresponding to that one of the Parallel Flushers 146.

Figure 7:
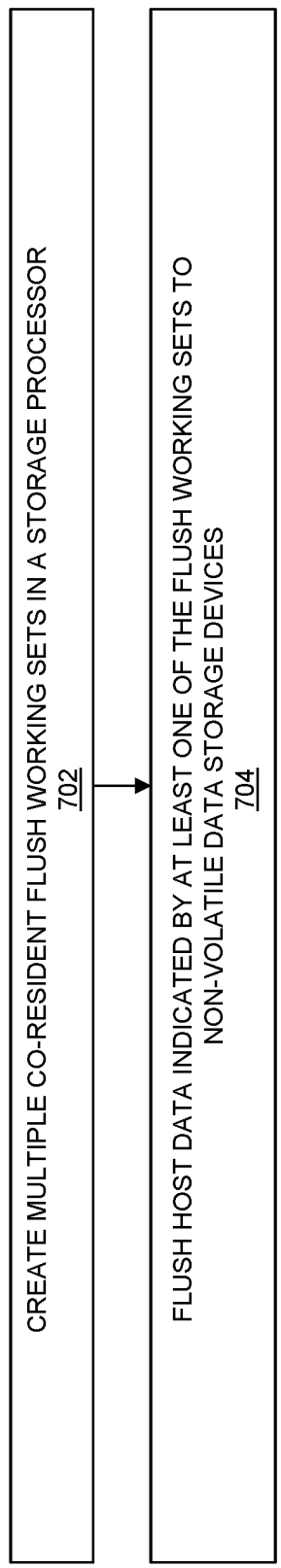
FIG. 7 is another flow chart showing an example of steps performed in some embodiments.

FIG. 7 is another flow chart showing an example of steps performed in some embodiments of the disclosed technology.

At step 702, the disclosed technology creates multiple co-resident flush working sets in a storage processor of a data storage system, including an active flush working set for storing indications of newly received blocks of host data, and at least one frozen flush working set that was previously an active flush working set. Each flush working set indicates host data that was received by the data storage system from at least one host computing device during a period of time corresponding to that flush working set.

At step 704, the disclosed technology flushes host data indicated by at least one of the frozen flush working sets to non-volatile data storage devices of the data storage system.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising: creating a plurality of co-resident flush working sets in a data storage system, wherein each one of the flush working sets indicates only host data that was received by the data storage system from at least one host computing device during a period of time corresponding to that flush working set, wherein host data indicated by the flush working sets is to be flushed from a storage processor of the data storage system to non-volatile data storage devices of the data storage system, wherein indications of host data within the flush working sets are organized according to logical block addresses of the indicated host data, wherein each flush working set includes a plurality of leaf nodes, wherein each leaf node stores second indications of page descriptors that are located within a page descriptor ring, wherein each page descriptor stores an indication of a block of received host data to be flushed and having a logical block address within a range of logical block addresses corresponding to the one of the leaf nodes that contains that page descriptor, and wherein the second indications of page descriptors are ordered ascendingly within each leaf node according to the logical block addresses of the blocks of host data indicated by the page descriptors; and flushing, by a plurality of independently executing flusher threads, host data indicated by at least one of the flush working sets from the storage processor to the non-volatile data storage devices of the data storage system.

2. The method of claim 1, further comprising:
creating the flush working sets by creating a currently active flush working set and a plurality of frozen flush working sets;
adding new indications of host data received by the data storage system only to the currently active flush working set; and
wherein the flusher threads flush host data indicated by at least one of the frozen flush working sets from the storage processor to the non-volatile data storage devices.

3. The method of claim 2, further comprising:
wherein the flusher threads flush host data indicated by an oldest one of the frozen flush working sets from the storage processor to the non-volatile data storage devices before flushing host data indicated by any other one of the frozen flush working sets.

4. The method of claim 3, further comprising:
detecting a flush working set creation event;
in response to detecting the flush working set creation event:
freezing the currently active flush working set such that no more indications of received host data are added to it, and
creating a new currently active flush working set, such that indications of subsequently received host data are added to the new currently active flush working set.

5. The method of claim 4, further comprising:
further in response to detecting the flush working set creation event:

in response to detecting that all host data indicated by the oldest one of the frozen flush working sets has not yet been completely flushed from the storage processor to the non-volatile data storage devices, delaying the freezing of the currently active flush working set and the creating of the new currently active flush working set until after all host data indicated by the oldest one of the frozen flush working sets has been completely flushed from the storage processor to the non-volatile data storage devices.

6. The method of claim 4, wherein detecting the flush working set creation event comprises detecting that the currently active flush working set has consumed a threshold amount of a shared resource in the storage processor.

7. The method of claim 6, wherein the shared resource in the storage processor comprises the page descriptor ring; and
wherein the threshold amount comprises a percentage of a total number of page descriptors contained in the page descriptor ring.

8. The method of claim 7, wherein the ranges of logical block addresses corresponding to the leaf nodes node in the currently active flush working set each have a first size; and
wherein the new currently active flush working set is created such that the ranges of logical block addresses corresponding to the leaf nodes in the new currently active flush working set each have a second size that is different from the first size.

9. The method of claim 8, wherein the second size is determined based on a previous pattern of host data writes.

10. A data storage system comprising: processing circuitry; a memory; a persistent memory; a plurality of non-volatile data storage drives; and wherein the memory has program code stored thereon, wherein the program code, when executed by the processing circuitry, causes the processing circuitry to: create a plurality of co-resident flush working sets in the persistent memory, wherein each one of the flush working sets indicates only host data that was received by the data storage system from at least one host computing device during a period of time corresponding to that flush working set, wherein host data indicated by the flush working sets is to be flushed from a storage processor of the data storage system to the non-volatile data storage devices of the data storage system, wherein indications of host data within the flush working sets are organized according to logical block addresses of the indicated host data, wherein each flush working set includes a plurality of leaf nodes, wherein each leaf node stores second indications of page descriptors that are located within a page descriptor ring, wherein each page descriptor stores an indication of a block of received host data to be flushed and having a logical block address within a range of logical block addresses corresponding to the one of the leaf nodes that contains that page descriptor, and wherein the second indications of page descriptors are ordered ascendingly within each leaf node according to the logical block addresses of the blocks of host data indicated by the page descriptors; and flush, by a plurality of independently executing flusher threads, host data indicated by at least one of the flush working sets from the persistent memory to the non-volatile data storage devices of the data storage system.

11. The data storage system of claim 10, wherein the program code, when executed by the processing circuitry, further causes the processing circuitry to:

create the flush working sets by creating a currently active flush working set and a plurality of frozen flush working sets;

add new indications of host data received by the data storage system only to the currently active flush working set; and wherein the flusher threads flush host data indicated by at least one of the frozen flush working sets from the persistent memory to the non-volatile data storage devices.

12. The data storage system of claim 11, wherein the program code, when executed by the processing circuitry, further causes the processing circuitry to:

flush, by the flusher threads, host data indicated by an oldest one of the frozen flush working sets from the persistent memory to the non-volatile data storage devices before flushing host data indicated by any other one of the frozen flush working sets.

13. The data storage system of claim 12, wherein the program code, when executed by the processing circuitry, further causes the processing circuitry to:

detect a flush working set creation event;

in response to detection of the flush working set creation event:

freeze the currently active flush working set such that no more indications of received host data are added to it, and create a new currently active flush working set, such that indications of subsequently received host data are added to the new currently active flush working set.

14. The data storage system of claim 13, wherein the program code, when executed by the processing circuitry, further causes the processing circuitry to:

further in response to detection of the flush working set creation event:

in response to detecting that all host data indicated by the oldest one of the frozen flush working sets has not yet been completely flushed from the persistent memory to the non-volatile data storage devices, delay the freezing of the currently active flush working set and the creating of the new currently active flush working set until after all host data indicated by the oldest one of the frozen flush working sets has been completely flushed from the persistent memory to the non-volatile data storage devices.

15. The data storage system of claim 13, wherein detection of the flush working set creation event comprises detecting that the currently active flush working set has consumed a threshold amount of a shared resource in the data storage system.

16. The data storage system of claim 15, wherein the shared resource comprises the page descriptor ring; and wherein the threshold amount comprises a percentage of a total number of page descriptors contained in the page descriptor ring.

17. The data storage system of claim 16, wherein the ranges of logical block addresses corresponding to the leaf nodes node in the currently active flush working set each have a first size; and wherein the new currently active flush working set is created such that the ranges of logical block addresses corresponding to the leaf nodes in the new currently active flush working set each have a second size that is different from the first size.

18. A computer program product including a non-transitory computer readable medium having instructions stored thereon, wherein the instructions, when executed on processing circuitry, cause the processing circuitry to perform steps including: creating a plurality of co-resident flush working sets in a data storage system, wherein each one of the flush working sets indicates only host data that was received by the data storage system from at least one host computing device during a period of time corresponding to that flush working set, wherein host data indicated by the flush working sets is to be flushed from a storage processor of the data storage system to non-volatile data storage devices of the data storage system, wherein indications of host data within the flush working sets are organized according to logical block addresses of the indicated host data, wherein each flush working set includes a plurality of leaf nodes, wherein each leaf node stores second indications of page descriptors that are located within a page descriptor ring, wherein each page descriptor stores an indication of a block of received host data to be flushed and having a logical block address within a range of logical block addresses corresponding to the one of the leaf nodes that contains that page descriptor, and wherein the second indications of page descriptors are ordered ascendingly within each leaf node according to the logical block addresses of the blocks of host data indicated by the page descriptors; and flushing, by a plurality of independently executing flusher threads, host data indicated by at least one of the flush working sets from the storage processor to the non-volatile data storage devices of the data storage system.

* * * * *